March 24, 1959

V. V. COLAIACE 2,878,734

UNIVERSAL FOCUSING SCALE

Filed Dec. 3, 1956

Victor V. Colaiace
INVENTOR.

BY Daniel I. Mayne
Harold F. Bennett
ATTORNEY & AGENT

United States Patent Office 2,878,734
Patented Mar. 24, 1959

2,878,734

UNIVERSAL FOCUSING SCALE

Victor V. Colaiace, Rochester, N.Y., assignor to Eastman Kodak Company, Rochester, N.Y., a corporation of New Jersey Application December 3, 1956, Serial No. 625,887

2 Claims. (Cl. 95—44)

This invention relates to photographic objectives, and more particularly to focusing scales for objectives of the type which can be focused to produce sharp images on a predetermined plane.

The object of my invention is to provide a focusing objective including a focusing scale which is adapted to be interchangeably used with different objectives of different focal lengths during the assembly thereof in the factory, the different focal lengths being within the normal range of variation of focal length in the production of a lens according to a given set of specifications.

A particular object of my invention is to provide a single focusing ring which is usable in the assembly of all objectives in a production run of objectives according to a given specification and is accurate for each of these objectives regardless of their variations in focal length from the standard.

Figure 1:
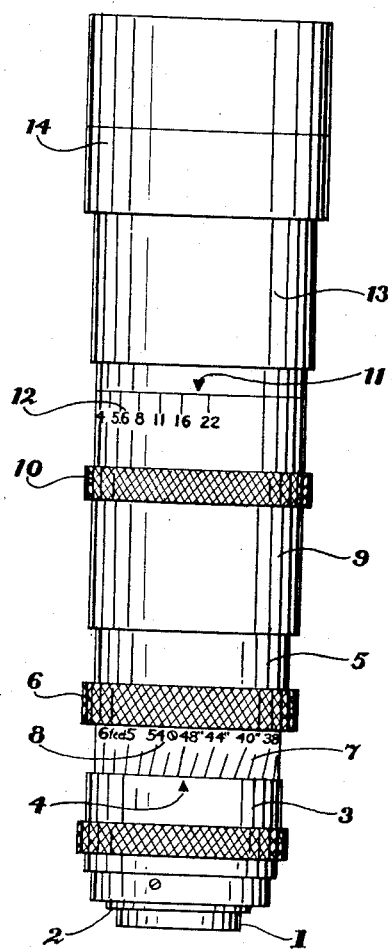
Fig. 1 shows an objective according to the invention focused on a close-up object.

In focusing objectives, and particularly in focusing objectives for use on motion-picture cameras, the parts are ordinarily arranged so that the objective can be focused through a normal range of movement and produce a sharp image of an object from say three feet to infinity. Of course, this normal range of distance is given as a typical example and depends upon the purpose for which the objective has been designed. In modern objectives there is usually provided a focusing scale engraved on a ring which is rotated during focusing and an index mark on the non-rotating part of the objective for reading the distance of the object plane which is sharply in focus.

In practice, in producing lenses in a factory according to a given set of specifications, there are unavoidable variations in the refractive index of the glasses used, in the thickness of the lens elements and in radii of curvature of the lens surfaces. All these variations combine to cause a variation of the actual focal length through a small range of perhaps ±4 percent from one individual lens to another. On inferior types of lenses, or on lenses of low aperture in which the required accuracy of focusing is of a low order, the manufacturer often elects to make up one focusing ring based on the focal length of the norm and to let it be good enough for all the lenses of the production run. If the manufacturer has been lucky enough to have chosen a focal length which is at about the middle of the range of variations, the maximum error which will be introduced is only one-half the total range of variation or about 4 percent. In the production of high-quality, high-aperture lenses, however, it has been the practice in some factories for the designer or the engineering staff to divide the total range of expected or allowable variation in focal length into several portions or zones numbering from perhaps 5 to 10 or more such that one focusing scale is accurate enough within tolerances for all focal lengths within any one zone. Separate focusing rings or focusing scales are then made up separately for each of the zones and kept in stock in the assembly department. Then during the assembly of a batch or a production run of lenses of a given type, each lens is assembled in its barrel and its focal length is measured on the lens bench or by any suitable means, and the zone into which it falls is determined from a chart which is provided for that purpose. The lens barrel is then disassembled to the extent necessary to remove the focusing ring and reassembled with the focusing ring having the proper scale corresponding to the zone in which that particular lens lies. The lens is then mounted on the lens bench again and focused for some specific object distance such as infinity and the focusing scale properly positioned to read that object distance and attached to the focusing ring of the lens barrel in that position, whereupon the lens can be focused by turning the focusing ring, and the object distance indicated will be accurate within acceptable tolerances for the whole scale. It is generally simpler to choose infinity as the point at which to set the lens but of course the maximum error is slightly reduced if a point is chosen near the middle of the scale. For example, in the production of a 100 mm. objective, if it has been found that a 1 mm. variation in focal length is tolerable without changing the focusing scale and that lenses in a production run may vary ±4 percent in the majority of cases, then one batch of focusing rings would be made up for focal lengths from 96 to 97 mm., another batch for 97 to 98 mm. focal length, and so on up to the eighth batch for focal lengths from 103 to 104 mm. Then for each individual lens the appropriate focusing scale is chosen and used in the manner above described.

According to the present invention, an objective which is adapted to be focused through a normal range of object distances by turning a focusing ring is provided with a focusing scale which is adjustable during assembly with respect to the focusing ring both circumferentially and axially and which is permanently attachable to the focusing ring in a selected position, said focusing scale being provided with a series of marks each of which runs in a direction generally parallel with the axis of the lens and the scale as a whole running in a circumferential direction, characterized by the marks being spaced closer together at one side of the scale and proportionately farther apart at the other side of the scale hereinafter identified as the short focal length side and the long focal length side of the scale respectively to a degree greater than the total allowable variation in focal length of the lenses in a production run whereby the short focal length side of the scale provides a focusing scale for lenses with focal lengths shorter than the norm and the long focal length side of the scale provides a focusing scale for lenses with a longer focal length than the norm. Finally, means are provided during the assembly of the lens for relative movement of the focusing scale and the index mark co-operating therewith in an axial direction for selecting that circumference or portion of the scale which matches the focal length of the objective under test.

It may be noted that there are several ways which will occur to those skilled in the art of matching the focal length of the objective with a given zone of the focusing scale ring according to the invention. One of these is to measure the focal length of the lens and to have an auxiliary scale for determining the relative position of the index mark and the focusing scale accordingly. Another is to set the lens in the lens bench and focus it on infinity by rotating the focusing ring and attaching the focusing scale ring to the focusing ring temporarily by a clamp or jig which permits sliding the focusing ring in an axial direction without losing the infinity setting and then as a final step providing a close-up object and focusing the lens onto the close-up object by turning the focusing ring and the focusing scale ring clamped thereto along with it and finally sliding the focusing scale ring in an axial direction until it reads the proper close-up distance. Of course, it is not necessary to choose an infinite distance for this purpose and preferably a distance near the middle of the scale is chosen for which the index mark runs in a direction strictly parallel to the axis of the lens.

Fig. 1 shows an objective by way of example which comprises a rearward extension 1 and a shoulder 2 adapted to be seated on a camera. The camera or the objective may be provided with a latch of any standard type for holding the objective on the camera. The objective also comprises a relatively fixed barrel portion 3 on which is inscribed on the edge a focusing mark 4. A focusing ring 5 is provided with a knurled flange 6 and is attached to the barrel in a standard way so that when it is turned for focusing it rotates circumferentially without movement in the axial direction. The objective is provided with threaded means not shown by which a rotation of the focusing ring 5 with its knurled flange 6 moves the lens mount 13 in an axial direction for focusing. The lens mount 13 has a rearward extension, not shown, within the parts that are shown and carries the optical elements of the lens in the usual way. Also in the usual way the diaphragm setting ring 9 provided with a knurled flange 10 is moved axially along with the lens mount 13 during focusing. The lens mount 13 and the diaphragm ring 9 are respectively provided with an index mark 11 and a diaphragm scale 12 which co-operate to indicate the diaphragm setting in the usual way. To complete the picture of the standard objective, a hood or sunshade 14 is usually provided at the front end thereof.

According to the invention, the focusing ring 5 is provided with a focusing scale 7 which is attached to the focusing ring during assembly by means of a screw 8. Conveniently the knurled ring 6 is made up integrally with the focusing scale 7. The fixed portion 3 of the lens barrel overlies the focusing scale 7 to a certain extent so that the latter can be adjusted in the axial direction and of course it can be adjusted in a circumferential direction before being attached permanently by means of the screw 8 as hereinbefore described.

Figure 2:
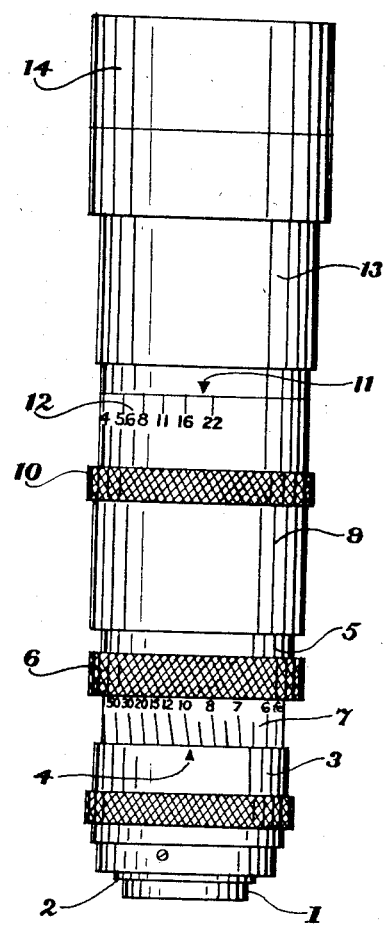
Fig. 2 shows the same objective focused on a more distant object.

Fig. 2 shows the same objective refocused on an object at about 10 feet distance. Although my draftsman has shown the lens mount 13 and the sunshade 14 in the same relative position on the page of drawings, and has shown the attaching extension 1 and shoulder 2 moved relatively forward, that is, upward, on the sheet of drawings, it is more common for the camera along with the rearward extension 1 and shoulder 2 attached thereto to remain fixed and the forward parts of the objective to move backward relative thereto. The focusing index 4 may optionally be provided with a depth of focus scale, not shown, in the usual manner.

Figure 3:
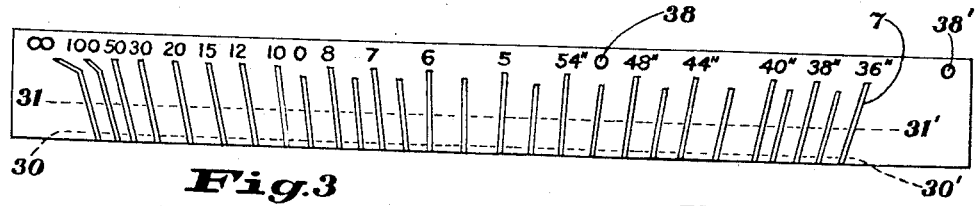
Fig. 3 is a developed showing of the focusing scale shown in two positions in Figs. 1 and 2.

Fig. 3 shows a developed rendering of the focusing scale 7 which, in the example shown, runs from the infinity mark at the left end to the 36-inch mark at the right end. According to the invention these various marks on the scale diverge from the bottom of the figure toward the top of the figure so that along the dotted line 30, 30' at the bottom of the figure, they provide a focusing scale for a lens whose focal length is $(F-D)$ where F is the normal focal length according to the specifications and D is the allowable deviation in focal length, while along another circumference 31, 31' in the middle or upper portion of the figure, the scale marks provide a focusing scale for a lens whose focal length is $(F+D)$ and the degree of divergence of the scale marks is precomputed in accordance with the predetermined allowable deviation D and with the distance between the two lines 30, 30' and 31, 31' which corresponds to the predetermined axial adjustment of the focusing ring 7. Although the location of the circumference 31, 31' may optionally be very close to the top end of the scale marks, I prefer for aesthetic reasons and for easy reading of the scale to leave a considerable portion of the scale marks exposed between the fixed portion of the barrel 3 and the knurled ring 6. On the other hand, too short a distance between circumference 30 and circumference 31 leads to too great a divergence between the scale lines and too sharp a slant for the extreme scale marks, infinity and 36 inches.

While for some reasons it is desirable to have the mark for infinity run parallel to the axis of the lens, and this is convenient if there is not too great a divergence between the several marks of the scale, it is also desirable from the standpoint of reducing the maximum slant of the scale mark for the shortest object distance to have a mark near the center of the scale run parallel to the axis. In the example shown the mark corresponding to 5½ feet runs substantially parallel with the axis of the lens.

In putting my invention into practice, the lens is assembled with the focusing scale ring 7 assembled loosely on the focusing ring 5 and the lens is focused successively for two different object distances and the focusing scale adjusted circumferentially and axially to match the two different distances or, as above mentioned, the focal length of the lens is measured and the axial adjustment of the focusing scale is determined from a chart and measured from an auxiliary scale.

While my invention is not limited to any particular method of assembling the objective, two methods that have proven practical are described as follows:

In one method the focal length of the lens is measured on the lens bench and the operator uses a scale (not shown) which has been prepared in advance and indicates the distance from the rear shoulder of the knurled ring 6 to the front shoulder of the fixed portion 3 of the lens barrel, and the operator then adjusts the ring 7 so that as read by the index mark 4 it indicates the proper distance of the test object upon which the lens is focused and at the same time using the auxiliary scale, which may be an ordinary mechanic's millimeter scale, the operator adjusts the position of the scale 7 in the axial direction to the corresponding focal length of the objective. This method requires the measurement of the focal length of the objective, the reading of a chart and the use of a small scale such as a millimeter scale. Another method is to provide a clamp or a fixture (not shown) which is temporarily clamped onto the focusing ring 5 and which is provided with a slot or shoulder (not shown) running in the axial direction. The objective is then focused on a test object at the distance of 5½ feet or whatever the distance is for which the corresponding scale mark runs rectilinearly and a mating clamp or fixture is clamped onto the focusing scale 7 so that the matching of the two shoulders or a slot-and-pin arrangement allows the focusing scale 7 to be slid in an axial direction but restrains it from rotating. The lens is then refocused by turning the ring 5 onto a very distant test object and the focusing scale 7 is slid in an axial direction until the index mark 4 stands opposite the scale mark for infinity. Whatever the method of adjusting the scale in the two directions, when the adjusting has been completed, a drill is inserted through holes 38 and 38' (see Fig. 3) of the scale and holes are bored and tapped in the focusing ring underneath, whereupon screw 8 is inserted for permanently attaching the scale ring.

Having now particularly described my invention what I desire to secure by Letters Patent of the United States and what I claim is:

1. A photographic objective in a tubular mount, a focusing ring surrounding said mount and adapted to focus said objective from infinity to approximately 3 feet by turning the ring, a focusing scale member surrounding said focusing ring and adjustable relative thereto both circumferentially and axially during assembly of the objective, a focusing scale consisting of a series of marks on said member, each of which marks extend in the direction generally parallel to the axis of the lens and the scale as a whole extending in a circumferential direction, a ring fixed relative to the lens mount overlying and concealing a portion of the width of said scale throughout the full length thereof and having an index mark on the edge of the fixed ring adjacent said scale marks, and means for permanently attaching the scale member to the focusing ring when properly so adjusted, said scale marks converging in an axial direction and being spaced proportionately closer together at one side of the scale than at the other to a degree greater than that corresponding to the total predetermined allowable range of variation in the focal length of the lens in a production run, whereby during assembly of the lens, a circumference of the scale having marks spaced correspondingly to the focal length of the individual lens may be selected and permanently positioned opposite said index mark.

2. An objective according to claim 1 in which a mark near the middle of the scale is substantially parallel to the lens axis and the marks on each side of it converge towards it in an axial direction.

References Cited in the file of this patent

UNITED STATES PATENTS

| | | |
|---|---|---|
| 1,755,177 | Fruwirth | Apr. 22, 1930 |
| 2,508,649 | Powers | May 23, 1950 |